(12) United States Patent
Close et al.

(10) Patent No.: US 6,616,877 B2
(45) Date of Patent: Sep. 9, 2003

(54) RESILIENT ARTICLE AND METHOD OF MANUFACTURING SAME USING RECYCLED MATERIAL

(75) Inventors: Matthew M. Close, Tucson, AZ (US); Nicholas H. Danna, 7240 Sonia Way, Tucson, AZ (US) 85741; David R. Smith, Tucson, AZ (US)

(73) Assignee: Nicholas H. Danna, Tucson, AZ (US)

( * ) Notice: Subject to any disclaimer, the term of this patent is extended or adjusted under 35 U.S.C. 154(b) by 0 days.

(21) Appl. No.: 09/750,641

(22) Filed: Dec. 28, 2000

(65) Prior Publication Data

US 2001/0048177 A1 Dec. 6, 2001

Related U.S. Application Data

(60) Provisional application No. 60/183,454, filed on Feb. 18, 2000.

(51) Int. Cl.[7] .......................... B29C 47/92; B29C 47/38
(52) U.S. Cl. .................. 264/151; 264/211.21; 264/912; 264/920
(58) Field of Search .......................... 264/151, 171.17, 264/210.2, 209.4, 211.21, 234, 920, 912, 178 R

(56) References Cited

U.S. PATENT DOCUMENTS

| | | | |
|---|---|---|---|
| 3,027,599 A | | 4/1962 | Pluhacek et al. |
| 4,627,804 A | * | 12/1986 | Kobayashi et al. ............ 425/71 |
| 4,859,166 A | * | 8/1989 | Hamada et al. ............. 425/204 |
| 4,970,043 A | | 11/1990 | Doan et al. |
| 5,094,905 A | | 3/1992 | Murray |
| 5,167,894 A | * | 12/1992 | Baumgarten ................. 264/175 |
| 5,171,499 A | * | 12/1992 | Cehelnik et al. ............. 264/151 |
| 5,312,573 A | | 5/1994 | Rosenbaum et al. |
| 5,316,708 A | | 5/1994 | Drews |
| 5,375,777 A | | 12/1994 | Pehrson |
| 5,478,516 A | * | 12/1995 | Malm et al. ................. 264/146 |
| 5,510,419 A | | 4/1996 | Burgoyne et al. |
| 5,516,270 A | * | 5/1996 | Lehtinen ........................ 425/71 |
| 5,536,459 A | * | 7/1996 | Morita ......................... 264/145 |
| 5,634,599 A | | 6/1997 | Khais et al. |
| 5,714,219 A | | 2/1998 | Mashunkashey et al. |
| 5,800,754 A | | 9/1998 | Woods |
| 5,865,009 A | | 2/1999 | Jackson et al. |

\* cited by examiner

Primary Examiner—Mark Eashoo
(74) Attorney, Agent, or Firm—W. Kirk McCord

(57) ABSTRACT

A resilient article and method of manufacturing the same using recycled materials are described. Predetermined amounts of thermoset material and thermoplastic binder are mixed and extruded into a die, from which the mixture emerges in the form of a sheet having the approximate thickness of the finished article. The mixture then enters a calibrator, which more precisely shapes the sheet to the desired thickness. The sheet is then cooled and cut to the desired dimensions to provide the finished article. The thermoset material used in the mixture is preferably ground vehicle tire rubber with the fabric and metal removed and the thermoplastic binder is preferably waste polyethylene. The apparatus and method according to the present invention is particularly well suited for manufacturing resilient articles for use as expansion joint material.

13 Claims, 4 Drawing Sheets

RESILIENT ARTICLE AND METHOD OF MANUFACTURING SAME USING RECYCLED MATERIAL

CROSS-REFERENCE TO RELATED APPLICATION

This application claims the benefit of U.S. Provisional Application No. 60/183,454, filed Feb. 18, 2000.

TECHNICAL FIELD

This invention relates generally to expansion joints and in particular to an apparatus and method for making resilient articles using recycled material, such as recycled vehicle tire rubber.

BACKGROUND ART

Environmental considerations have dictated the use of recycled materials in many different types of products. For example, many different types of paper and plastic products contain recycled materials. It is also known to use recycled material, such as recycled vehicle tire rubber, as a thermoset material to extrude relatively hard articles (i.e., articles having a shore A hardness of 70 or greater) as shown in U.S. Pat. No. 5,312,573. However, the process described in this patent is not suitable for manufacturing resilient articles such as expansion joints.

Expansion joints are typically interposed between structural members such as sections of concrete paving to accommodate expansion and contraction of the structural members between which the expansion joint is interposed. It is advantageous both from an environmental and cost perspective to be able to manufacture expansion joints using recycled material.

There is, therefore, a need for a cost effective apparatus and method to manufacture resilient articles, such as expansion joints, using recycled material.

SUMMARY OF THE INVENTION

In accordance with the present invention, a resilient article suitable for use as expansion joint material and method of manufacturing same using recycled material are provided. Predetermined amounts of recycled thermoset material and thermoplastic binder are mixed and heated to achieve a mixture having a predetermined density. The mixture is then extruded into a die from which the mixture emerges at approximately the desired thickness of the finished article. The mixture then enters a calibrator, which more precisely adjusts the thickness of the mixture. The mixture is then cooled and cut to the dimensions desired for the finished article.

In accordance with a feature of the invention, an extruder is provided having a mixing chamber containing a rotatable screw member and a heating device operatively associated with the mixing chamber. Rotation of the screw member at a predetermined rate draws the mixture through the chamber and further mixes the thermoset and thermoplastic materials with air in the mixing chamber.

In accordance with another feature of the invention, the die has a heater operatively associated therewith for maintaining the mixture at a relatively uniform density consistent with the desired thickness of the finished article.

In accordance with yet another feature of the invention, the calibrator maintains the desired thickness of the mixture as it begins to cool.

In the preferred embodiment, the thermoplastic binder is waste polyethylene material and the thermoset material is ground vehicle tire rubber with the fabric and metal removed. To provide a finished article suitable for use as an expansion joint, the mixture is preferably comprised of about 80% thermoset material and about 20% thermoplastic binder, by weight.

BEST MODE FOR CARRYING OUT THE INVENTION

In the description which follows, like parts are marked throughout the specification and drawings with the same respective reference numbers. The drawings are not necessarily to scale and in some instances proportions may have been exaggerated in order to more clearly describe the best mode for carrying out the invention.

Figure 1A:
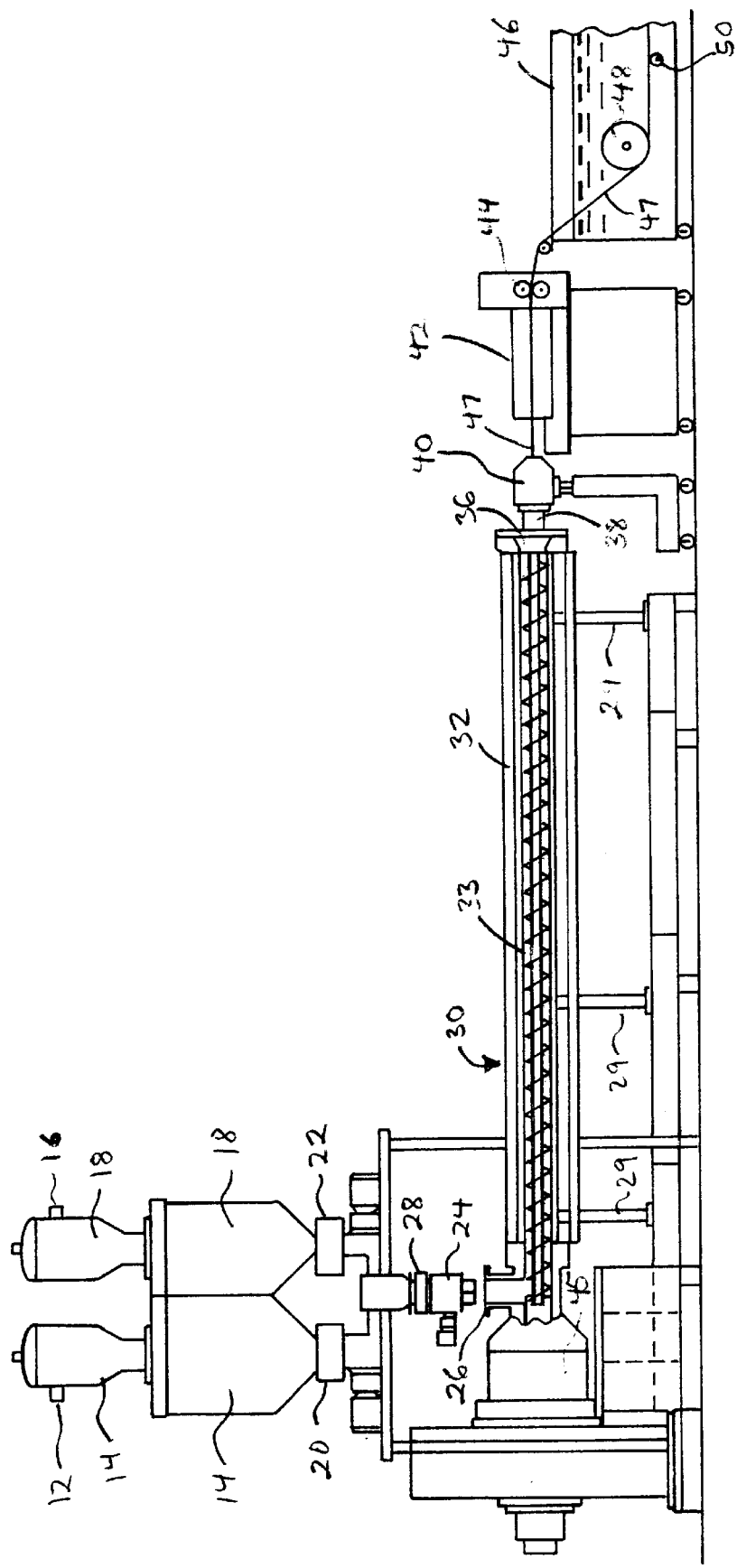
FIGS. 1A–1C are schematics illustrating the manufacturing of resilient articles using recycled materials, according to the present invention.
Figure 1B:
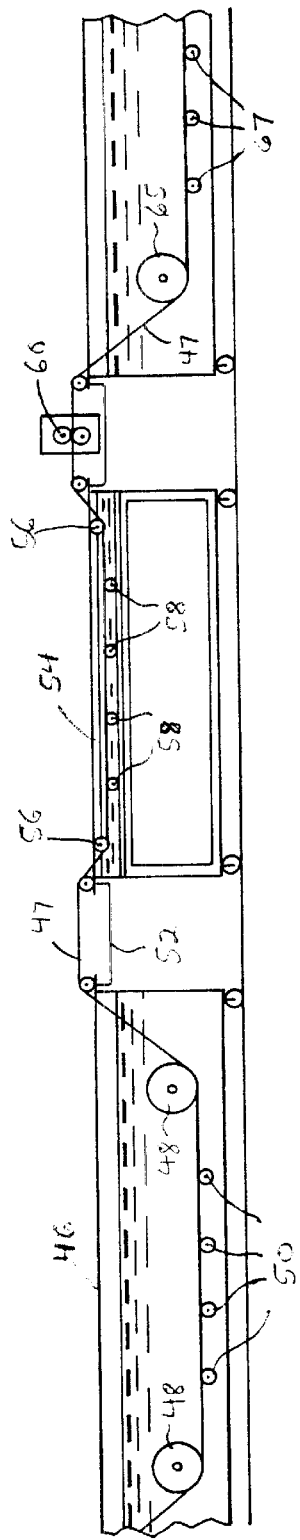
Figure 1C:
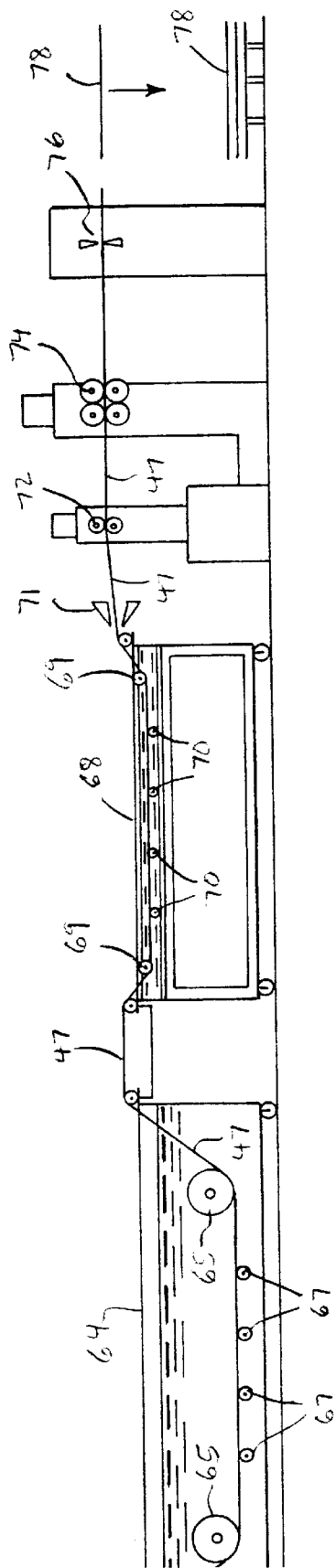

Referring now to FIGS. 1A–1C, apparatus 10 is provided for manufacturing resilient articles using a thermoplastic binder 12 and thermoset material 16. Binder 12 is stored is a silo or the like (not shown) and is conveyed to a vacuum hopper 14. Material 16 is also stored in a silo or the like (not shown) and is conveyed to a vacuum hopper 18. Binder 12 and material 16 are conveyed through respective metered feeders 20, 22 in precisely measured quantities into a mixer 24, where binder 12 and material 16 are thoroughly premixed. Magnet drawer 28 co-operates with feeders 20, 22 to monitor the proper ratio of binder 12 to thermoset material 16. After binder 12 and material 16 have been thoroughly mixed, they are conveyed via inlet 26 into an extruder.

Thermoset material 16 is preferably ground crumb rubber recycled from vehicle tires. Rubber material 16 is ground to particle sizes from fine powder to particles having a diameter in a range from about 1/50 inch to 5/16 inch in the case of generally spherical particles and having a length in a range from about 1/50 inch to about 5/16 inch in the case of generally elongated particles. For best results, the particle shapes and sizes should be relatively uniform throughout material 16.

Binder 12 is preferably waste or scrap polyethylene material or the like Binder 12 preferably is comprised of spherical particles having a diameter in a range from about 1/60 inch to about 3/8 inch or elongated particles having a length in a range from about 1/60 inch to about 3/8 inch. For best results, the particle shapes and sizes should be relatively uniform throughout material 16.

The ratio of binder 12 to thermoset material 16 is also important in achieving the desired results. For example, if binder 12 comprises six percent or less by weight of the mixture, the resulting product is very rubbery, has reduced strength and has a relatively slow process rate because of the longer bonding time. Conversely, if binder 12 comprises 60 percent or more by weight of the mixture, the resulting product is very dense and resilient, but experiences undesirable changes in resilience with temperature. To provide a product suitable for use as an expansion joint, the mixture should be comprised of binder 12 from about 12 percent to about 32 percent by weight and thermoset material 16 from about 68 percent to about 88 percent by weight, with the preferred ratio being about 20 percent binder 12 to about 80 percent thermoset material 16 by weight.

Figure 2:
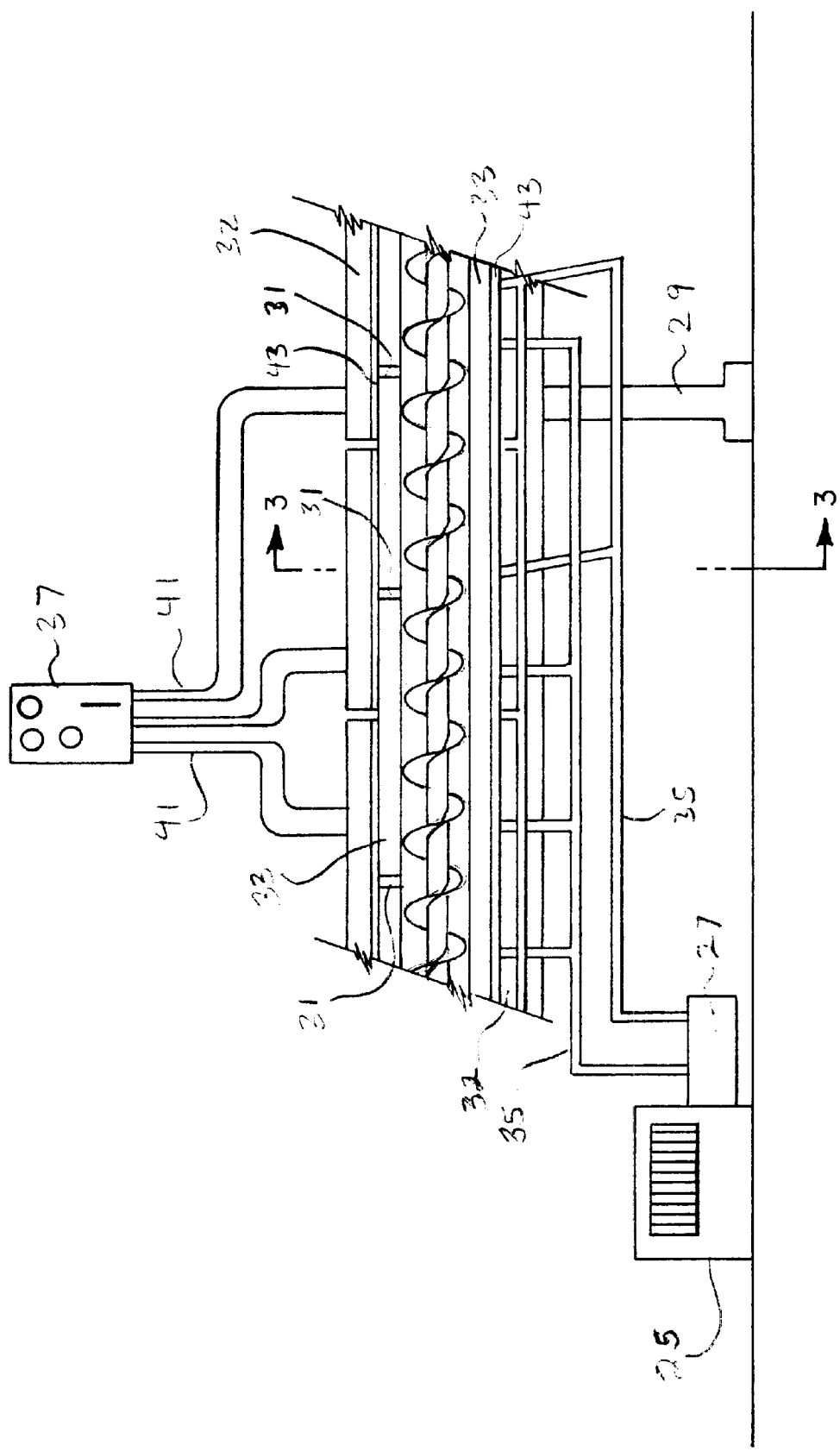
FIG. 2 is a sectional view, taken along the line 2—2 in FIG. 3.
Figure 3:
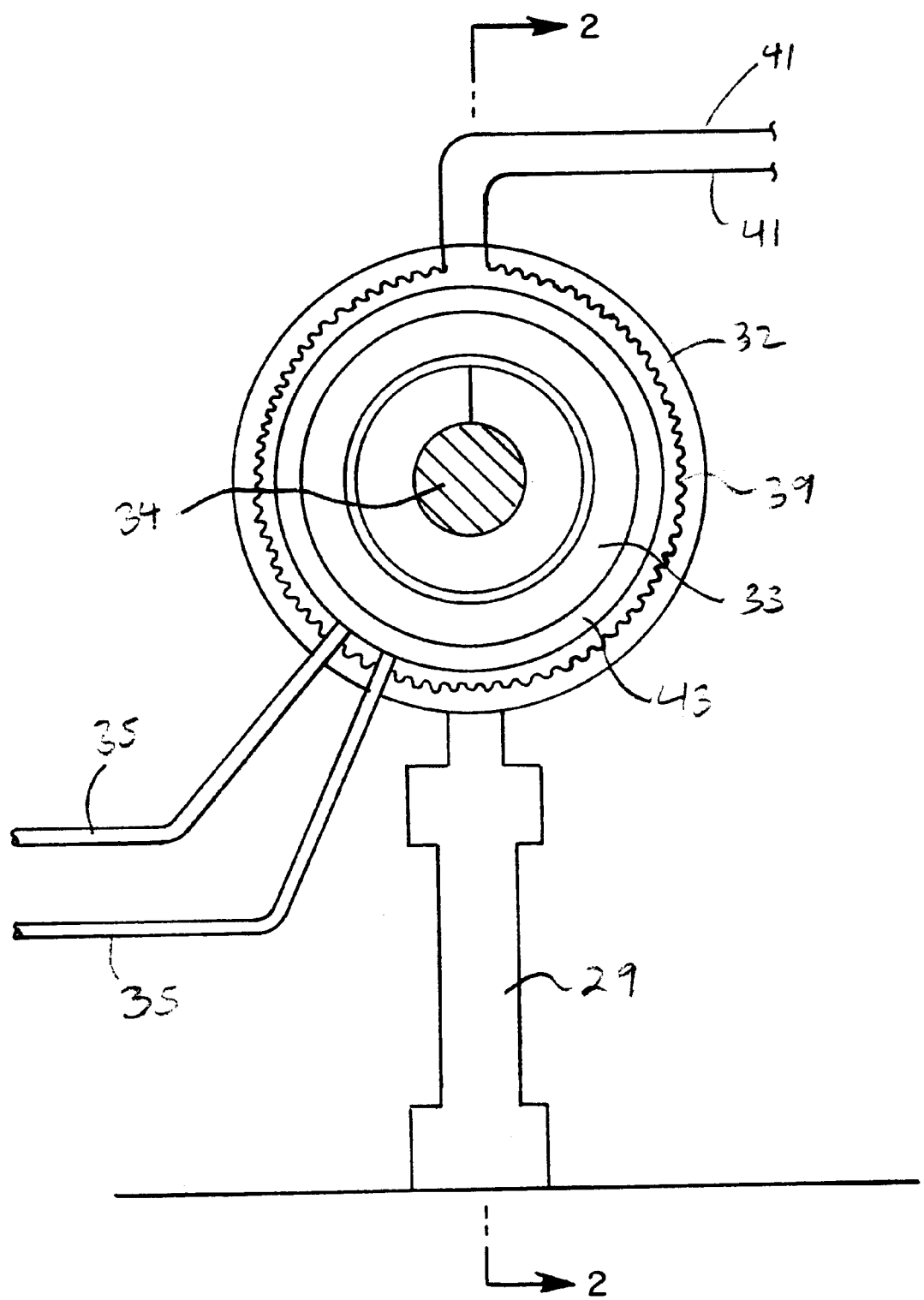
FIG. 3 is a sectional view taken along the line 3—3 in FIG. 2.

Referring also to FIGS. 2 and 3, a generally cylindrical extrusion barrel 30 is supported by plural support members 29. Barrel 30 is preferably made of steel with a bimetallic inner lining 33. Plural cast aluminum heating jackets 32 are concentrically positioned around barrel 30 to provide plural heat zones along the length of barrel 30. Each jacket 32 contains an electrically resistive heating element 39 connected to an electrical control panel 37 by means of electrical conductors 41. Each jacket 32 also has a cooling groove 43 spirally wound through the corresponding jacket 32. Each groove 43 is connected to a cooling water pump 27 by means of conduits 35. Pump 27 circulates cooling water through conduits 35 into the groove 43 of each jacket 32. A shell and tube heat exchanger 25 is provided for cooling the water circulated in conduits 35. A temperature sensor 31 is embedded in bimetallic inner lining 33 and is connected to control panel 37. Panel 37 has a thermostat (not shown) operatively associated therewith for maintaining the temperature inside barrel 30 within a predetermined range by selectively operating heating elements 39 and pumping cooling water through grooves 43, as required.

Referring now to FIG. 1A, located within barrel 30 is a two-stage screw 34, which is rotatably driven by an electric drive motor 45. Rotation of screw 34 draws the mixture through barrel 30 in the direction of an extruder outlet 36 and further mixes binder 12 with material 16. Screw 34 is configured and its rotational speed is controlled so as to thoroughly mix thermoplastic binder 12 and thermoset material 16 and draw the mixture through inner casing 31 at a pressure sufficient to force the mixture through outlet 36, but not so great as to remove air from inner casing 31. The first stage of screw 34, which begins adjacent to extruder inlet 26, has flutes formed on the shaft of screw 34 which are of a first predetermined pitch and which are separated by a first predetermined distance. The second stage of screw 34, which ends adjacent to extruder outlet 36, has flutes formed on the shaft which are of a second predetermined pitch and which are separated by a second predetermined distance. Screw 34 further includes a relatively abrupt transition region between the stages. For example, screw 34 may have a length of about 20 feet and the transition region between stages may have a length of only about 18 inches.

A tapered transition section 38 is interposed between extruder outlet 36 and an adjustable sheet die 40. The extrusion pressure must be sufficient to force the mixture through transition section 38 and consolidate the mixture in die 40, but not so great as to remove air from the mixture. It is desirable to entrap air in the mixture such that air comprises about 6–18 percent of the mixture by volume, depending on the desired density of the mixture. For example, if the mixture is comprised of approximately equal amounts of binder 12 and material 16, the extrusion pressure should be in a range from about 200 psi to about 2000 psi, depending on the desired density of the finished article. The extrusion pressure is a function of the configuration of screw 34, transition section 38 and die 40. The mixture is extruded into die 40 at a rate which allows the mixture to uniformly fill die 40 without creating back pressure which could force air from the mixture.

Die 40 has adjustable lips at the outlet thereof to shape the mixture to the desired thickness. Die 40 also has a precision heater (not shown) operatively associated therewith to keep the mixture at a relatively uniform density within die 40, consistent with the desired characteristics of the finished article.

Upon exiting die 40, the mixture is in the form of a sheet 47 having a predetermined width and thickness. Sheet 47 then enters a calibrator 42, which helps maintain the finished surface of sheet 47 and controls the uniformity and thickness of sheet 47 as it begins to cool. Plural nip rollers 44 are operatively associated with calibrator 42 for moving sheet 47 in a left to right direction.

The process by which sheet 47 is cooled will now be described with reference to FIG. 1B. After sheet 47 is pulled through nip rollers 44, it is drawn into a deep cooling tank 46, which is filled with chilled water at a temperature in a range from about 40° F. to about 55° F. The chilled water is circulated between tank 46 and a chilling tower (not shown). Sheet 47 is drawn under plural large leveling rollers 48 and over smaller leveling rollers 50 immersed in the chilled water in tank 46. Sheet 47 then passes over a shallow drip pan 52, which collects most of the surface water draining off sheet 47 and pipes it back to deep cooling tank 46 by means of a conduit (not shown). Sheet 47 then enters a shallow cooling tank 54, which is filled with chilled water having a temperature in a range from about 40° F. to about 55° F. The chilled water is circulated between tank 46 and a chilling tower (not shown). Within tank 54, sheet 47 then passes underneath two small leveling rollers 56 and over the top of four small leveling rollers 58. As sheet 47 exits tank 54, it is drawn through top and bottom embossing rollers 60, which are electrically heated. The surfaces of sheet 47 are heated by infrared elements (not shown) prior to being rolled by rollers 60, which impart a relatively uniform and consistent finish on both major surfaces of sheet 47.

Referring now to FIG. 1C, sheet 47 then passes through another deep cooling tank 64 with rollers 65, 67, another drip pan 66 and another shallow cooling tank 68 with rollers 69, 70. When sheet 47 exits tank 68, it is drawn to a pneumatically driven knife 71, which cuts sheet 47 to a desired length as measured by a timing wheel (not shown) attached to knife 71. The cut sheet 47 is then pulled by dual roll stands 72, 74 and trimmed to the desired width of the finished article 78. The trimmed material is ground and recycled back (not shown) to mix with the starting materials (binder 12 and thermoset material 16). A third roll stand 76 pulls article 78 along and plural fans (not shown) blow air on article 78 as it passes through stand 76 to remove residual moisture before article 78 is palletized as shown.

CHARACTERISTICS OF FINISHED ARTICLE 78

Finished article 78 preferably has a shore A hardness of at least 25 and preferably greater than 45. The density of article 78 should be less than 35 pounds per cubic foot and is preferably about 31 pounds per cubic foot. The water absorbed by article 78 should not be more than 15 percent by weight volume, when saturated for a period of 24 hours, and preferably should not be more than 5 percent by weight volume. Article 78 should be compressible to 50 percent of its original thickness when subject to a compressive pressure of not less than 100 psi, but not more than 1,250 psi. Article 78 should exhibit no more than three percent loss by weight volume in a compression test, within the given test parameters.

Finished article 78 should recover to at least 70 percent (and preferably at least 90 percent) of its original thickness, after being compressed to about 50 percent of its original thickness, within 10 minutes after release of the compression load. Article 78 should not exhibit extrusion of more than 75 percent (and preferably no more than 25 percent) of its original thickness on one edge thereof, with the other edges being fixed, when article 78 is compressed to 50 percent of its original thickness.

EXAMPLE

An apparatus of the type shown and described hereinabove with reference to FIGS. 1–5 was used to manufacture finished articles 78 having characteristics corresponding to a conventional 3 foot×10 foot×½ inch horizontal expansion material. Ground tire waste, with metal and fabric removed, was used as the thermoset material and waste polyethylene was used as the thermoplastic material. The polyethylene material was mixed with the ground tire waste in a ratio of about 15–25 percent polyethylene material to about 75–85 percent ground tire waste, by weight. The polyethylene material was in the form of recycled pellets having a substantially spherical shape and a diameter of about ⅛ inch. The ground tire waste was also in the form of particles having a substantially spherical shape and a diameter of about ⅛ inch.

Extruder barrel 30 was configured with an eight inch customized two-stage screw 34, which was rotated at about 80 rpm. Screw 34 had a length of about 20 feet, yielding a ratio of about 30:1. Outlet opening 36 had a diameter of about eight inches and transition section 38 was tapered from the eight inch inlet opening to the inlet to sheet die 40. The convergence in transition section 38 to the inlet of die 40 results in some back pressure in barrel 30. However, this back pressure is not so great as to remove free air from the mixture. No screen was used at outlet 36. The temperature of the mixture exiting extruder barrel 30 was in a range from about 385° F. to about 415° F.

Uniform distribution of the extruded mixture in sheet die 40 is achieved by a holding bank or cavity within die 40. The extrudate is allowed to flow uniformly into die 40. Die 40 had tool steel construction so that there is essentially no resistance to the flow of extrudate into die 40. Die 40 was equipped with cartridge heat controls (not shown) to control the temperature of each square inch of contact between the extruded mixture and the inner surface of die 40, so as to maintain the temperature of the mixture within die 40 in a range from about 475° F. to about 525° F. Die 40 produced a continuous sheet 47 having a width of about 74 inches and a thickness of about ½ inch, with relatively smooth surfaces.

Calibrator 42 held sheet 47 while it began to cool, to maintain the uniformity of sheet 47 throughout its entire thickness. Sheet 47 was allowed to cool sufficiently in calibrator 42 such that it was not distorted by nip rollers 44, which kept sheet 47 moving continuously during the cooling process.

The continuous sheet 47 was drawn through cooling tanks 46, 54, 64, 68, as described hereinabove. Finishing rollers 48, 50, 56, 58 not only guided sheet 47, but also helped smooth the major surfaces of sheet 47. The cooling process provide a sheet 47 which was stable to handle and could be palletized as a finished article 78 without concern for automatic combustion.

Sheet 47 was then heated on both its top and bottom major surfaces by infrared heater 62 and then further smoothed and finished by embossing rollers 60. Electrical resistance heating elements associated with rollers 60 heated sheet 47 to a temperature in a range from about 425° F. to about 475° F. A relatively uniform surface finish and porosity were established in sheet 47 prior to its entering the last two cooling tanks 64, 68.

Upon exiting cooling tank 68, air knife 71 cut continuous sheet 47 into 10 foot lengths. A wheel cutter (not shown) was used to split the 74 inch wide sheet 47 into two 37 inch wide sheets 47 and the edges of each sheet 47 were trimmed to yield a finished article 78 having a 36 inch width, a 10 foot length and a ½ inch thickness. Article 78 exited forced air blower station 76 at a temperature in a range from about 150° F. to about 175° F. and was then palletized for further handling and distribution.

In accordance with the present invention a resilient article suitable for use as expansion joint material is provided. The article is made using waste materials, which is advantageous both from a cost and environmental standpoint.

The best mode for carrying out the invention has now been described in detail. Since changes in and additions to the above-described best mode may be made without departing from the nature, spirit and scope of the invention, the invention is not to be limited to said details, but only by the appended claims and their equivalents.

What is claimed is:

1. A method of manufacturing a resilient article, comprising the steps of:

mixing respective predetermined amounts of a binder material and a thermoset material to provide a mixture having a predetermined density;

heating the mixture and extruding it into and through a die, such that the mixture emerges from the die as a sheet having a thickness corresponding to a desired thickness of the resilient article, said extruding including introducing the mixture into a barrel having a rotatable screw at a predetermined rate to entrap air into the mixture and to force the mixture through the barrel into the die, such that the mixture relatively uniformly fills the die without back pressure sufficient to remove entrapped air from the mixture;

allowing the sheet to cool after it emerges from the die and maintaining the thickness of the sheet approximately equal to the desired thickness as the sheet cools; and cutting the sheet to provide the resilient article.

2. The method of claim 1 further including heating the mixture in the die to maintain the mixture at the predetermined density in the die.

3. The method of claim 1 further including adjusting the thickness of the sheet to more precisely match the desired thickness of the sheet as the sheet begins to cool after it emerges from the die.

4. The method of claim 1 wherein the mixture is comprised of binder material in a range from about 12% to about 32% by weight and thermoset material in a range from about 68% to about 88% by weight.

5. The method of claim 1 wherein the mixture is comprised of about 20% binder material and about 80% thermoset material by weight.

6. The method of claim 1 wherein the binder material is comprised of waste polyethylene material.

7. The method of claim 6 wherein the waste polyethylene material is comprised of particles of substantially uniform size and shape.

8. The method of claim 1 wherein the thermoset material is comprised of ground rubber from a recycled vehicle tire, with fabric and metal from the tire having been substantially removed.

9. The method of claim 8 wherein the ground rubber is comprised of particles of substantially uniform size and shape.

10. The method of claim 1 further including passing the sheet between plural rollers to impart a relatively uniform finish to surfaces of the sheet as it cools.

11. The method of claim 1 further including enhancing cooling of the sheet by immersing it in liquid.

12. The method of claim 1 wherein said heating the mixture includes heating the mixture in the barrel and in the die.

13. A method of manufacturing a resilient article using recycled materials, comprising the steps of:

mixing respective predetermined amounts of a binder comprised of recycled material and a thermoset comprised of ground vehicle tire rubber with fabric and metal material having been substantially removed, to provide a mixture having a predetermined density;

introducing the mixture into a barrel having a rotatable screw and rotating the screw at a predetermined rate to entrap air into the mixture and to extrude the mixture into and through a die, such that the mixture emerges from the die as a sheet having a thickness corresponding to a desired thickness of the resilient article;

heating the mixture in the barrel and in the die to maintain the mixture substantially at said predetermined density;

further adjusting the thickness of the sheet after it emerges from the die to more precisely match the desired thickness of the sheet;

cooling the sheet and passing the sheet through plural rollers to impart a relatively uniform finish to surfaces of the sheet; and cutting the sheet to provide the resilient article.

* * * * *